US012197272B2

(12) United States Patent
Lixingyu et al.

(10) Patent No.: US 12,197,272 B2
(45) Date of Patent: Jan. 14, 2025

(54) HANG RECOVERY AND ERROR REPORTING ARCHITECTURE ON FPGA-BASED CONTROLLER SOLUTIONS

(71) Applicant: NVIDIA Corporation, Santa Clara, CA (US)

(72) Inventors: Leon Lixingyu, Sunnyvale, CA (US); Prosenjit Chatterjee, San Francisco, CA (US); Anshu Nadkarni, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 72 days.

(21) Appl. No.: 17/859,352

(22) Filed: Jul. 7, 2022

(65) Prior Publication Data

US 2024/0012705 A1  Jan. 11, 2024

(51) Int. Cl.
*G06F 11/00* (2006.01)
*G06F 11/07* (2006.01)

(52) U.S. Cl.
CPC ...... *G06F 11/0769* (2013.01); *G06F 11/0721* (2013.01)

(58) Field of Classification Search
CPC ............. G06F 11/0721; G06F 11/0751; G06F 11/0757; G06F 11/0769; G06F 11/0778; G06F 11/0787; G06F 11/2025
See application file for complete search history.

(56) References Cited

U.S. PATENT DOCUMENTS

| | | | |
|---|---|---|---|
| 10,725,848 B2 | 7/2020 | Kurts et al. | |
| 11,188,407 B1* | 11/2021 | Swanson | G06F 11/1435 |
| 2008/0164908 A1* | 7/2008 | Challenger | G06F 9/4494 326/46 |
| 2016/0306701 A1* | 10/2016 | Heil | G06F 11/1441 |
| 2017/0329686 A1* | 11/2017 | Bhagwat | G06F 11/26 |

OTHER PUBLICATIONS

Putnam, et al. "A Reconfigurable Fabric for Accelerating Large-Scale Datacenter Services". IEEE 2014, 12 pages.
Jacobs, et al., University of Florida. "Reconfigurable Fault Tolerance: A Comprehensive Framework for Reliable and Adaptive FPGA-Based Space Computing." ACM Transactions on Reconfigurable Technology and Systems, vol. 5, No. 4, Article 21, Publication date: Dec. 2012. 30 Pages.

\* cited by examiner

*Primary Examiner* — Michael Maskulinski
(74) *Attorney, Agent, or Firm* — Lowenstein Sandler LLP

(57) ABSTRACT

A system includes a device having a controller a plurality of finite state machines (FSMs). The device is to detect that one or more FSMs of the plurality of FSMs fails to satisfy a non-idle duration criterion during an operation, where the one or more FSM that fail to satisfy the non-idle duration criterion are associated with one or more errors. The device is to determine a location of the one or more FSMs that fail to satisfy the non-idle duration criterion. The device is to record the location of the one or more FSMs and the one or more errors, restore the one or more FSM to an idle state, and transmit an indication that the one or more FSMs failed to satisfy the non-idle duration criterion.

20 Claims, 6 Drawing Sheets

HANG RECOVERY AND ERROR REPORTING ARCHITECTURE ON FPGA-BASED CONTROLLER SOLUTIONS

TECHNICAL FIELD

At least one embodiment pertains to processing resources used to perform and facilitate hang recovery and error reporting. For example, at least one embodiment pertains to technology for comprehensive hang recovery and error reporting architecture on field-programmable gate array (FPGA) based controller solutions, according to various novel techniques described herein.

BACKGROUND

Data centers can store and process data for various purposes. Typically, the data center will include multiple nodes, each node having multiple graphics processing units (GPUs). To ensure the data center is operating reliably, the data center can determine GPU metrics (e.g., telemetry data) and monitor the GPUs via a baseboard or baseboard management controller (BMC). In some examples, a host system of the data center can communicate with the baseboard via an application programming interface (API) to collect telemetry data (e.g., thermals, power, etc.). Some data centers use a field-programmable gate array (FPGA) based controller to manage the communications between the host system and the baseboard—e.g., the host system can communicate with the FPGA-based controller to collect telemetry data. In some examples, the FPGA or components coupled to the FPGA can timeout (e.g., experience a hang or be in a non-idle state for a time that exceeds a threshold) when executing a request for telemetry data. This can cause subsequent requests to fail and force users of the data center to manually triage, debug, and/or recover the BMC or FPGA based-controller. Manual triage, debug, and recovery can take days and cause delays in obtaining additional telemetry data.

BRIEF DESCRIPTION OF DRAWINGS

Various embodiments in accordance with the present disclosure will be described with reference to the drawings, in which.

DETAILED DESCRIPTION

Figure 1A:
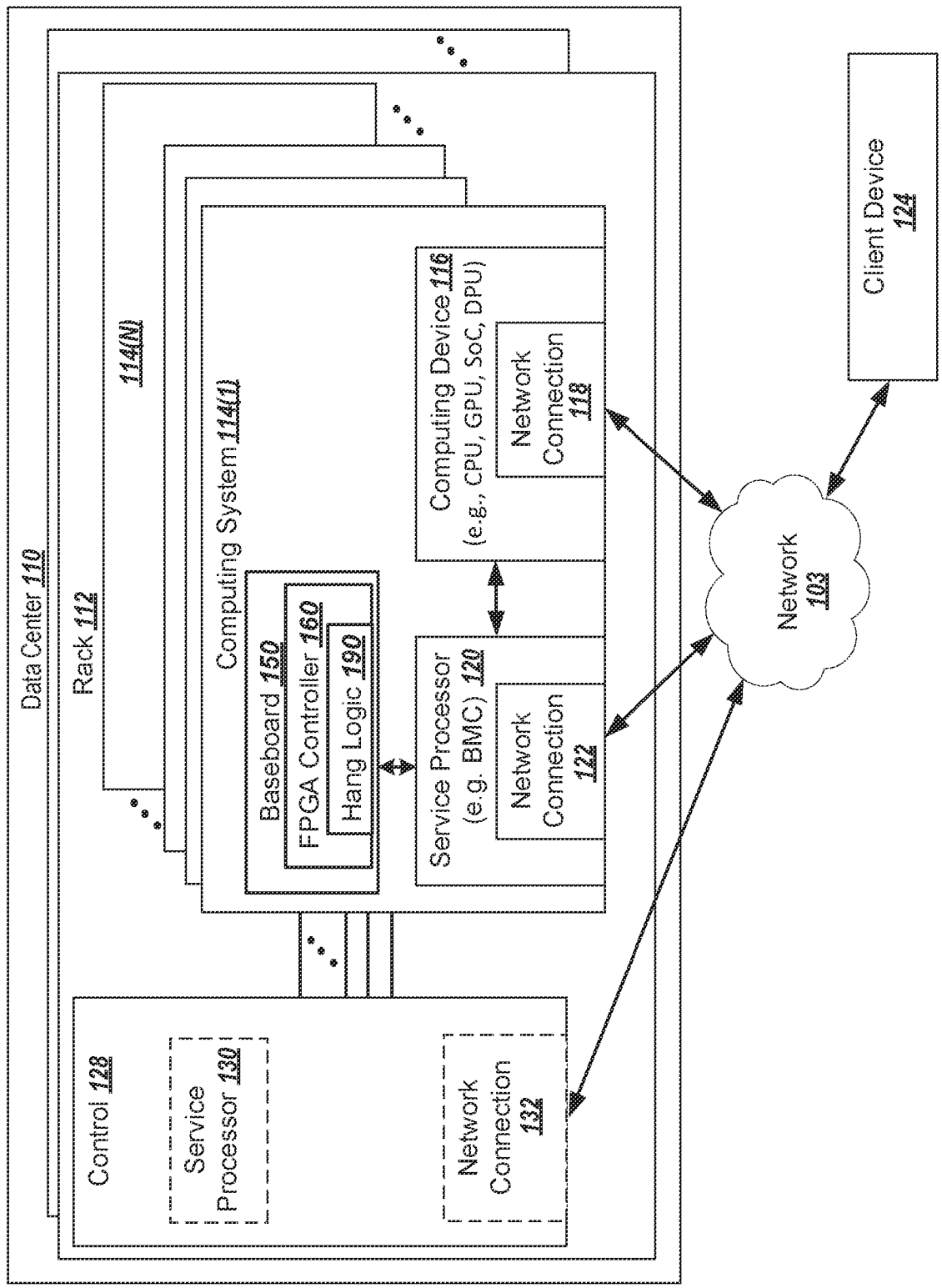
FIGS. 1A and 1B are example system utilizing a field-programmable gate array (FPGA) based controller with an hang recovery and error reporting architecture accordance with at least some embodiments.

Data centers can store and process data for various purposes. A data center can include multiple nodes, where each node includes multiple graphics processing units (GPUs). The data center can implement a management controller to ensure the data center is operating reliably. For example, the data center can include a baseboard and a baseboard management controller (BMC) to collect GPU metrics (e.g., telemetry data that includes thermal and power information) and monitor the data center performance. The BMC can be coupled with or otherwise operate in a host system of the data center. For example, the host system can communicate via the BMC with the baseboard and an application programming interface (API) to collect the telemetry data—e.g., the host system can communicate with the baseboard via a power management bus (PMBus) or system management bus post-box interface (SMBPBI) protocol or interface. The baseboard can include a controller to facilitate communications with the host system. For example, the baseboard can include a field-programmable gate array (FPGA) based controller to manage the communications between the host system and the baseboard—e.g., the host system can communicate with the ASIC-based or FPGA-based controller to collect telemetry data.

The host system can send a request for a portion of the telemetry data to the FPGA-based controller. In some examples, the FPGA or components coupled with the FPGA can time out (e.g., experience a hang) while executing the request sent by the host system. For example, the FPGA or components coupled to the FPGA can be in a non-idle state for a duration that exceeds a threshold. In conventional solutions, there is no indication the FPGA has experienced a hang which can cause subsequent requests sent by the host system to also fail—e.g., the host system can fail to receive telemetry data associated with multiple requests due to the first request causing the hang. Additionally, conventional solutions implementing FPGA-based controllers fail to have (e.g., or have inadequate) hang recovery and error reporting. Accordingly, users of the data center may manually triage, debug, and/or recover the FPGA or BMC—e.g., the users can manually recover the BMC or FPGA back to the idle state. The manual triage, debug, and/or recovery can take up to several weeks hurting the performance of the data center and causing the same errors to repeatedly occur. Further, recovering the FPGA or BMC can involve performing resets (e.g., performing alternating current (AC) or direct current (DC) cycle resets) which increase system down time and cause the performance of the data center to decrease.

Advantageously, aspects of the present disclosure can address the deficiencies above and other challenges by implementing a hang recovery and error reporting architecture for field-programmable gate array (FPGA) based controller solutions. For example, the FPGA can be viewed as a set of interacting finite state machines (FSMs). During a testing session of the FPGA (e.g., the FPGA is a device under test (DUT)), possible errors and events causing a hang (e.g., a non-idle state to exceed a threshold time) are determined for the FSMs. For example, the FPGA can receive test data randomized to simulate possible requests during operation in the data center. By simulating possible inputs (e.g., stimuli), a hang recovery and error reporting architecture can be implemented such that for every FSM in the DUT that is in a non-idle state it will return to an idle state, any resettable register (e.g., counters) holding a non-reset value is reset back to a reset value, and any error or hang experienced is properly recorded and reported. Additionally, the FPGA can indicate whether the FPGA is available to receive additional requests from the host system—e.g., the FPGA can notify the host system if it is unavailable to receive additional requests due to an error or hang. In some examples, a set of proof convergence techniques can be applied to show that the hang recovery and error reporting architecture determined during the test session can be applied for any device cycle to infinity—e.g., the hang recovery and error reporting architecture can be implemented for the life of the device and still ensure that when a hang is experienced, the device is brought back to the idle state. Accordingly, once the FPGA is implemented within the host system, the hang recovery and error reporting architecture can be used to detect if any FSM fails to return to the idle state, determine the location of the FSM that fails to return to the idle state, restore the FSM back to the idle state, and transmit an indication to the host system that the FSM had failed to return to the idle state—e.g., that the FPGA experienced a hang.

By implementing the hang recovery and error reporting architecture for the FPGA, performance of the system can be improved. For example, the hang recovery and error reporting architecture can automatically indicate locations of bugs and errors and reduce triage, debug, and/or recovery times. Further, the host system can be notified if the FPGA is experiencing a hang and whether or not the FPGA is available for additional requests enabling the host system to determine when to send additional requests. Additionally, as the FGPA is brought back to the idle state each time, the system can avoid performing resets (e.g., performing alternating current (AC) or direct current (DC) cycle resets), improving the overall performance of the system.

FIG. 1A is a block diagram of a field-programmable gate array (FPGA) based controller system 100 implementing a hang recovery and error reporting architecture in an exemplary data center 110, according to at least one embodiment. The system 100 can include a data center 110, a network 103, and a client device 124.

The data center 110 can include a rack 112 of one or more computing systems 114(1)-114(N), where N is a positive integer equal to or greater than zero. Each computing system 114 can include a computing device 116, a service processor 120, and a baseboard 150. In some embodiments, the baseboard 150 can be a part of or entirely within the service processor 120. In some embodiments, the baseboard 150 can be an example of or include NVIDIA DGX or HGX servers. In at least one embodiment, the service processor 120 is a baseboard management controller (BMC). The BMC can be part of an intelligent platform management interface (IPMI) type interface and can be located on a circuit board (e.g., motherboard) of the computing device 116 being monitored. The BMC or baseboard 150 can include one or more sensors that are operatively coupled to the computing device 116 or integrated within the computing device 116. The sensors of a BMC or baseboard 150 measure internal physical variables such as temperature, humidity, power-supply voltage, fan speeds, communications parameters, and operating system (OS) functions. The BMC can provide a way to manage a computer that may be powered off or be otherwise unresponsive. The service processor 120 provides out-of-band functionality by collecting data such as the power consumption data of the computing device 116 independently from the computing device's CPU, firmware, and OS. The service processor 120 can provide the data (e.g., power consumption data) via a network connection 122 independent from a primary network connection 118 of the computing device 116. The service processor 120 can use the network connection 122 to the hardware itself rather than the OS or login shell to manage the computing device 116, even if the computing device 116 is powered off or otherwise unresponsive.

In some embodiments, the data center 110 can include a control 128 that includes a service processor 130 and is coupled with the network 103 via a network connection 132. In some embodiments, the control 128 can monitor and manage the data center 110.

Figure 1B:
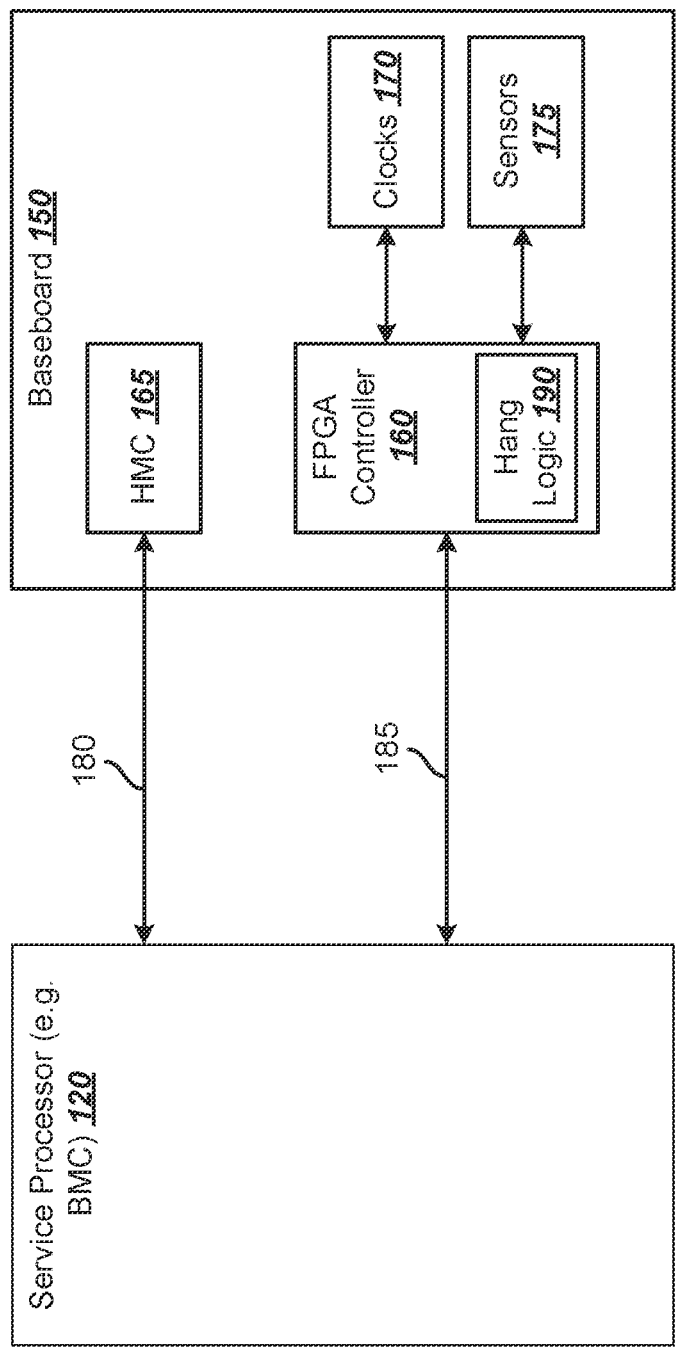

As illustrated in FIG. 1B, the baseboard 150 can include a hardware management controller (HMC) 165, a field-programmable gate array (FPGA) controller 160, clocks 170, and sensors 175. In some embodiments, the HMC 165 is configured to manage and set up servers or computing systems 114. In some embodiments, the HMC 165 is configured to manage multiple servers. In at least one embodiment, the service processor 120 is coupled with the HMC 165 via a link 180. In at least one embodiment, the link 180 is an example of a universal serial bus (USB) link—e.g., USB 2.0. In some embodiments, the FPGA controller 160 is configured to receive requests from the service processor 120 (e.g., from the BMC or from a host system BMC) and transmit information associated with the requests to the service processor 120. In some embodiments, the service processor 120 is coupled with the FPGA controller 160 via link 185. In some embodiments, the link 185 can be an example of a peripheral component interconnect express (PCIe) link (e.g., PCIe generation 2) or an example of an inter-integrated circuit (I2C) bus interface. In some embodiments, the FPGA 160 can be coupled with clocks 170 and sensors 175. In at least one embodiment, the clocks 170 can be examples of peripheral component interconnect express (PCIe)clocks, PCIe clock buffers, NVIDIA link (NVLink) clock buffers, etc. In at least one embodiment, the sensors 175 are configured to determine temperature, altitude, humidity, power-supply voltage, fan speeds, communications parameters, and/or operating system (OS) functions, etc. In at least one embodiment, the FPGA controller 160 can communicate with the service processor 120 via an application programming interface (API). For example, the FGPA controller 160 can utilize a system management bus post-box interface (SMBPBI) or a power management bus (PMBus) protocol. In such embodiments, the FPGA controller 160 can include SMBPBI service and/or SMBPBI proxy service controllers.

In at least one embodiment, the FPGA controller 160 comprises hang logic 190. In such embodiments, the hang logic 190 can utilize a hang recovery and error reporting architecture as described herein. For example, the FPGA controller 160 can recover to an idle state if an error occurs—e.g., the FPGA controller 160 can reset to the idle state if it is a non-idle state for a duration that satisfies a threshold. Additionally, the FPGA controller 160 can record the error and notify a host system of the error and the hang experienced—e.g., the FPGA controller 160 can transmit detailed logs of which finite state machines (FSMs) failed and how. In at least one embodiment, the FPGA controller 160 can implement the hang recovery and error reporting architecture after a test session. For example, the FGPA controller 160 can undergo the test session to determine errors that can occur and a process to return the FPGA controller 160 back to the idle state given a respective error occurs as described with reference to FIG. 2. In at least one embodiment, the FPGA controller 160 or baseboard 150 can include one or more finite state machines (FSMs). In such examples, the FSMs of the FPGA controller 160 or baseboard 150 can be monitored to determine locations of errors and be brought to the idle state as described with reference to FIG. 3.

Figure 2:
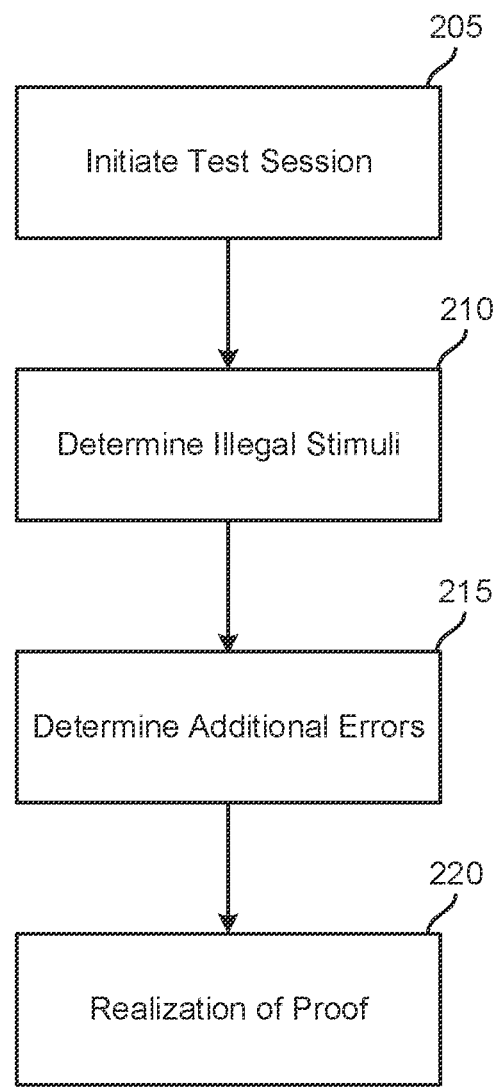
FIG. 2 illustrates a flow diagram of an example method to determine a hang recovery and error reporting architecture in accordance with at least some embodiments.

FIG. 2 illustrates a flow diagram of an example method 200 to determine a hang recovery and error reporting architecture, according to at least one embodiment. The method 200 can be performed by processing logic comprising hardware, software, firmware, or any combination thereof. In at least one embodiment, the method 200 is performed by system 100 or as described with reference to FIGS. 1A-B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other diagrams illustrating a method to determine a hang recovery and error reporting architecture are possible. In at least one embodiment, method 200 illustrates a test session of a field-programmable gate array (FPGA) controller—e.g., of FPGA controller 160 as described with reference to FIG. 1A-B.

At operation 205, processing logic can initiate a test session at a field-programmable gate array (FPGA) based controller—e.g., an FPGA configured as a controller or FPGA controller 160 as described with reference to FIGS. 1A-B. In at least one embodiment, the FPGA controller 160 undergoes testing to determine errors that can occur during operation of the FPGA controller 160 in a data center—e.g., data center 110 as described with reference to FIGS. 1A-B. In at least one embodiment, operation 205 can include providing random inputs (e.g., random data) that simulates operations of the FPGA controller 160 in the data center. For example, the FPGA controller 160 can receive four (4) bit inputs that simulate requests the FPGA controller 160 could receive from a host system. Based on the four bit input, the FPGA controller 160 could receive one of sixteen (16) unique inputs during a respective clock cycle. During the test session, the FPGA controller 160 continues to receive the random input bits during each clock cycle until realization of a hang recovery and error architecture as described with reference to operation 220.

At operation 210, processing logic can determine illegal stimuli (e.g., illegal inputs) for the FPGA controller 160. In some embodiments, illegal stimuli can be examples of scenarios that can cause the FGPA controller 160 to experience a hang or an error. In at least one embodiment, the illegal stimuli can be based on illegal inputs from a requester (e.g., a host system) or a responder (e.g., peripheral components as described with reference to FIG. 3). In at least one embodiment, the FPGA controller 160 can experience a hang when the FPGA controller 160 or components coupled with the FPGA controller 160 are in a non-idle state for a duration that satisfies a threshold—e.g., the FGPA controller 160 fails to perform an operation within a given duration. In some embodiments, the illegal stimuli can be determined during a production process. In at least one embodiment, the illegal stimuli can include, but is not limited to, the following examples: a requester (e.g., host system) transport protocol violation (e.g., the requester violates a system management bus post-box interface (SMBPBI) or a power management bus (PMBus) protocol); a requester interface protocol violation (e.g., the requester violates the inter-integrated circuit (e.g., I2C, IIC, I²C) protocol); a requester illegal payload (e.g., the requester transmits a command that is not within a protocol specification); parts of a request transmitted by the requester never arrive (e.g., requester transmits a start of packet command but fails to transmit an end of packet command); a responder transport protocol violation (e.g., a peripheral component as described with reference to FIG. 3 violates the SMBPBI or PMBus protocol); a responder interface protocol violation (e.g., a peripheral component violates the I2C protocol); a malformed response (e.g., peripheral component responds with fewer than expected read data bytes and does not respond further); and/or lost response packets (e.g., peripheral component does not respond to a read request with even sub-set of expected read data bytes). In some embodiments, there can be additional illegal stimuli determined during the test session.

At operation 215, processing logic determines additional errors or potential scenarios that could result in a hang. As described with reference to operation 205, the FPGA controller 160 receives random inputs during the test session. Accordingly, the processing logic can determine additional errors or additional scenarios other than the illegal stimuli that could result in a hang. In some embodiments, the FPGA controller 160 can receive inputs during the test session that are not common or rare during operation of the FPGA controller 160 in the data center. In at least one embodiment, the FPGA controller 160 can receive random inputs during the test session that are not associated with operations the FPGA controller 160 would perform in the data center—e.g., the FPGA controller 160 can be tested for unrealistic scenarios to determine a comprehensive hang recovery and error reporting architecture. Accordingly, the processing logic can determine legal stimuli (e.g., inputs that do not cause hangs or errors), illegal stimuli, hangs and errors possible in production, and hangs and errors not possible in production—e.g., inputs that correspond to unreal scenarios. It should be noted the random inputs to the FPGA controller 160 can fail to cover all scenarios as the inputs received by the FPGA controller 160 during operation in the data center. In at least one embodiment, the hang recovery and error reporting architecture described herein guarantees that for any legal or illegal combinations of inputs, the FPGA controller will not hang.

At operation 220, the processing logic can utilize a set of proof convergence techniques to realize unbounded proofs or proofs with sufficient bounds. For example, the FPGA controller 160 or device under test (DUT) can be considered as a set of finite state machines (FSMs) that interact with one another as described with reference to FIG. 3. In at least one embodiment, the processing logic can determine a hang recovery and error reporting architecture with a timeout mechanism that ensures that if one or more FSMs are in a non-idle state for a duration that satisfies a threshold duration they are reset back to an idle state such that any future request from a same requester or a different requester is processed without errors. Additionally, the hang recovery and error reporting architecture can process any other ongoing request transactions (e.g., requests different than the request that cause the hang or error) without errors. In at least one embodiment, the processing logic can create a formal verification test (e.g., formal verification of a de-hang mechanism) during the test session that satisfies the following: every FSM in the DUT in a non-idle state will be returned to the idle state eventually; every auxiliary FSM (e.g., a sub-state or protocol FSM as described with reference to FIG. 3) coupled to a primary FSM (e.g., FSM 305 as described with reference to FIG. 3) also returns to the idle state eventually; any resettable register (e.g., counters) holding a non-reset value is reset such that the resettable register holds a reset value after the reset; for every hang experienced at the primary FSMs, a respective interrupt, response, and/or error reporting event is generated; and the FPGA controller 160 indicates it can receive additional requests and responses (e.g., or that will eventually be ready to receive the additional request and response) after it processes a current response and request received from the host system—e.g., that the FGPA controller 160 can transmit an indication that is compliant with the API utilized by the host system.

In some embodiments, the test session can be performed for n number of cycles of the FPGA controller 160. To show the formal verification test would work for a lifetime of the DUT (e.g., for an infinite number of cycles), the processing logic can first determine the formal verification test works for a relatively high value (e.g., for a million cycles)—e.g., the processing logic can utilize mathematical induction to show that if the formal verification works for the n number of cycles, it works for an n+1 number of cycles and so forth infinitely. In some embodiments, the processing logic can fail to process the data from performing the test session for the n number of cycles, where n is a relatively large value (e.g., a million)—e.g., if the FPGA controller 160 receives a four (4) bit input, the FPGA controller 160 could fail to process the possibilities of inputs over the million cycles (e.g., the processing logic could fail to process $16^{1,000,000}$ different possibilities). Accordingly, a counter (e.g., or subset counters) can be modified in the DUT. For example, the processing logic can modify the counter such that they can increment or decrement by values different than how they would be incremented if the FPGA controller 160 was operating in the data center. In some embodiments, the processing logic could modify a logic implemented by the FPGA controller 160 during the test session. For example the processing logic could modify the logic ount value=current count value+x, where x is a value the counter increments or decrements operation in a data center, to count value=current count value+random value, where the random value is greater than or equal to x but less than or equal to a value that ensures a threshold value of the counter is not surpassed. For example, if the threshold value is ten (10) cycles and the current count value is four (4) cycles, the random value can be six (6) cycles—e.g., the count cannot be incremented by more than six (6) cycles as it would otherwise exceed the threshold value of the counter. By modifying the counter logic, the processing logic can simulate the n number of cycles without having to process each cycle up to the n number of cycles. For example, the FPGA controller 160 can increment by a value one (1) during operation in the data center—e.g., x is one (1). The random value can be greater than or equal to one (1) up to a value that ensures the threshold value is not surpassed. Accordingly, the FPGA controller 160 could simulate a million cycles in less steps than if the value remained as one (1)—e.g., the processing logic could simulate a million cycles in a thousand steps if the random value is a thousand rather than having to perform a million steps if the value is one (1). By modifying the counter logic, the processing logic can reduce an amount of data processed.

In some embodiments, the formal verification test could also include the following conditions; all or a group of FSMs (e.g., primary and associated auxiliary FSMs) start with a random non-reset value that is consistent, and fan-ins of large internal data structures are removed and treated as primary inputs to the DUT that can take random values in a respective cycle. In at least one embodiment, the processing logic can store the determined hang recovery and error reporting architecture (e.g., hang logic 190) in the FPGA controller 160.

It should be noted that although the method 200 is described with respect to an FPGA controller 160, it could be applied with other controllers as well. That is, the method 200 could be implemented in a system that utilizes an application-specific integrated circuit (ASIC), graphics processing unit (GPU), data processing unit (DPU), etc. In such examples, the method 200 can be modified according to an operation executed by the respective system. For example, a system executing a video game can refrain from resetting a respective FSM as that can cause performance issues and bring the FSM back to the idle state in a different manner.

Figure 3:
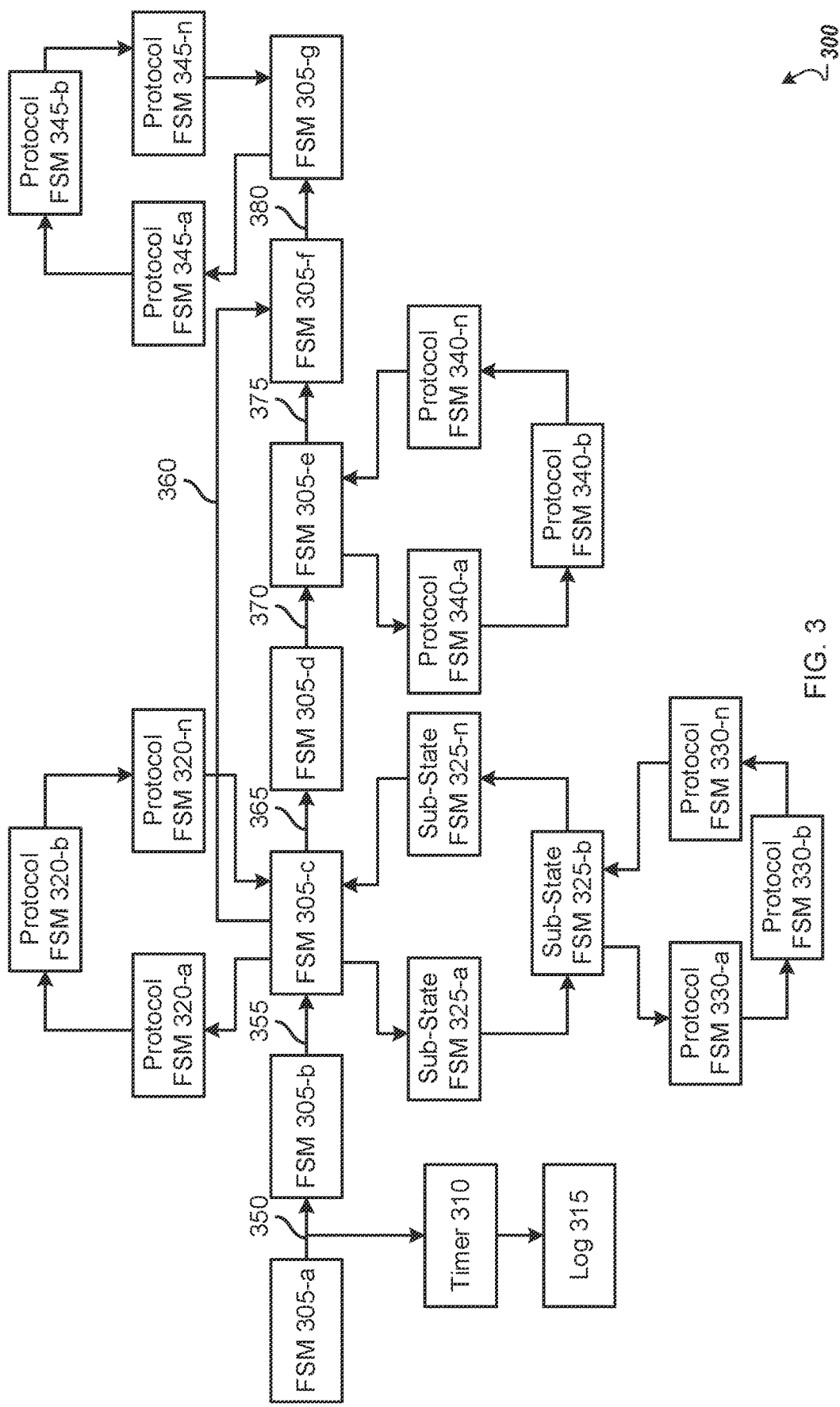
FIG. 3 illustrates an example a system including a set of finite state machines (FSM) implementing a hang recovery and error reporting architecture.

FIG. 3 illustrates a system 300 comprising a set of finite state machines (FSM) implementing a hang recovery and error reporting architecture, according to at least one embodiment. In some embodiments, the system 300 can be an example of an FPGA controller 160 as described with reference to FIG. 1. In some embodiments, system 300 can be an example of a baseboard 150 as described with reference to FIG. 1. System 300 can include FSMs 305 (e.g., FSMs 305-a through 305-g), timer 310, log 315, protocol FSMs 320 (e.g., protocol FSMs 320-a through 320-n, sub-state FSMs 325 (e.g., sub-state FSMs 325-a through 325-n), protocol FSMs 330 (e.g., protocol FSMs 330-a through 330-n), protocol FSMs 340 (e.g., protocol FSMs 340-a through 340-n), and protocol FSMs 345 (e.g., protocol FSMs 345-a through 345-n). In some embodiments, FSMs 305 can collectively be referred to as primary FSMs 305. Additionally, sub-state FSMs 325, protocol FSMs 320, protocol FSMs 330, protocol FSMs 340, and protocol FSMs 345 can be collectively referred to as auxiliary FSMs—e.g., FSMs that are coupled to primary FSMs 305. Although a certain quantity of FSMs are shown, the system 300 can include more or less FSMs—e.g., the system can include more than or less than seven (7) FSMs 305. The auxiliary and primary FSMs are configured to perform operations including, but not limited to, receiving requests, forwarding requests, processing requests, transmitting requests, etc.

In at least one embodiment, FSM 305-a is configured to initiate an operation—e.g., FSM 305-a indicates a start of a packet. In some embodiments, the system 300 is idle until the FSM 305-a initiates the operation. In some embodiments, the FSM 305-a can transmit an indication 350 to indicate the start of the packet to the FSM 305-b. In some embodiments, FSM 305-b (e.g., FSM req) is configured to receive read and write requests from a requester (e.g., a host system). In at least one embodiment, the FSM 305-b converts the request received to a format utilized by the system 300—e.g., converts the request to conform to an internal protocol. In some embodiments, the FSM 305-b is configured to transmit the converted request 355 to the FSM 305-c.

In some embodiments, FSM 305-c (e.g., FSM reqprocess) is configured to determine whether to process the request 355 internally (e.g., at the FPGA controller 160) or transmit the request 355 to an external device—e.g., a peripheral device such as a graphics processing unit (GPU), NVIDIA link switch chip (NVSWTICH), voltage regulator, thermal sensor, retimer, hot-swap controllers or components, peripheral component interconnect express (PCIe) switch (PEX switch), etc. In some embodiments, FSM 305-c is coupled with one or more protocol FSM 320. The FSM 305-c can transmit requests to the protocol FSM 320. In some embodiments, the protocol FSMs 320 are associated with peripheral devices. Each protocol FSM 320 can be associated with a different state of the protocol. For example, the protocol FSM 320-a can be associated with a first interface protocol state, protocol FSM 320-b can be associated with a second interface protocol state, protocol FSM 320-n can be associated with an $n^{th}$ interface protocol state, and so on.

In at least one embodiment, the FSM 305-c can be coupled with sub-state FSMs 325. In at least one embodiment, the sub-state FSMs 325 are configured to process or execute a sub-process of the request received by the FSM 305-c. In some embodiments, the FSM 305-c is configured to transmit the request 355 to the protocol FSM 320 or the sub-state FSM 325 based on a type of request. For example, if the request is a stream request, the FSM 305-c can transmit the request 355 to the protocol FSM 320-a and if the request is not a stream request, the FSM 305-c can transmit the request 355 to sub-state FSM 325-a. In at least one embodiment, the sub-state FSM 325-b can be coupled with protocol FSM 330-a—e.g., coupled with additional auxiliary FSMs.

In some embodiments, a peripheral device coupled to the FSMs 305 can be swapped out for a different peripheral device. In such embodiments, the system 300 can change a parameter value to incorporate the different peripheral device and refrain from modifying hang logic—e.g., the system 300 can refrain from changing the hang logic so long as the different peripheral device conforms to a protocol utilized by the system 300. In some embodiments, the FSM 305-c can transmit an indication 360 to FSM 305-f to indicate a sub-process is complete. In at least one embodiment, the FSM 305-c is configured to transmit the partially executed request 365 to FSM 305-d.

In at least one embodiment, the FSM 305-d (e.g., FSM fwd) is configured to forward the request 365 to peripheral devices. In some embodiments, the FSM 305-e (e.g., FSM_fwd_rsp) is configured to receive responses from the peripheral devices. In some embodiments, the FSM 305-e can convert the response received from the peripheral device to conform to a protocol utilized by the system 300. In at least one embodiment, the FSM 305-e is coupled with one or more protocol FSMs 340. The FSM 305-e can transmit requests to the protocol FSM 340-a. In some embodiments, the protocol FSMs 340 are associated with peripheral devices. Each FSM 340 can be associated with a different state of the protocol. For example, the FSM 340-a can be associated with a first interface protocol state, FSM 340-b can be associated with a second interface protocol state, FSM 340-n can be associated with an $n^{th}$ interface protocol state, and so on.

In some embodiments, FSM 305-f (e.g., FSM_fwd_req) is configured to determine whether a response is transmitted back to the sender/requester or dropped. In at least one embodiment, the FSM 305-e can determine whether to transmit an acknowledgement (ACK) indication or an indication that the request could not be executed (e.g., NACK) to the sender. For example, the FSM 305-e can determine if the operation has executed at FSMs 305-a-305-d. If the FSM 305-e determines the operation has been executed, the FSM 305-e can transmit the ACK indication. If the FSM 305-e determines the operation has not executed (e.g., that there is an error, hang, or time out of the operation), the FSM 305-e can transmit the NACK indication)If the FSM 305-e determines to transmit the response, the FSM 305-e can transmit an indication 380 to FSM 305-g indicating to transmit the response. In at least one embodiment, FSM 305-g is configured to transmit the response to the requester. In some embodiments, FSM 305-g is coupled with one or more protocol FSMs 345. The FSM 305-g can transmit requests to the protocol FSM 345-a. In some embodiments, the protocol FSMs 345 are associated with peripheral devices. Each protocol FSM 345 can be associated with a different state of the protocol. For example, the protocol FSM 345-a can be associated with a first interface protocol state, protocol FSM 345-b can be associated with a second interface protocol state, protocol FSM 345-n can be associated with an $n^{th}$ interface protocol state, and so on.

In some embodiments, the system 300 initiates a timer 310 when an operation is initiated—e.g., when FSM 305-a indicates a start of a packet. In some embodiments, the timer 310 is associated with the set of FSMs within the system 300. When the system 300 begins the operation, the system 300 goes from an idle state to a non-idle state. In some embodiments, the system 300 is configured to determine whether a non-idle duration criterion is satisfied for a respective operation that was initiated. That is, the system 300 can have a maximum duration associated with executing a respective operation. Different operations may have different maximum durations in embodiments. If the duration to perform the operation exceeds the maximum duration, it can indicate the system 300 is experiencing a hang or an error. Accordingly, if the timer 310 satisfies (e.g., exceeds) the maximum duration (e.g., the non-idle duration criterion) before the response is sent back to the sender (e.g., the operation is executed), the system 300 can begin resetting the set of FSMs back to the idle state utilizing the hang recovery and error reporting architecture. For example, if the timer 310 satisfies the non-idle duration criterion, the system 300 can record an error at the log 315. In some embodiments, the recorded error can include a type of error that occurred, which FSM has failed and how the FSM failed—e.g., the recorded error can identify one or more errors associated with the one or more FSMs from possible errors determined during a test session of the device as described with reference to FIG. 2. In some embodiments, the system 300 can also record a location of the error. That is, the system 300 can determine which FSM was executing the operation when the timer satisfies the non-idle duration criterion—e.g., the system 300 could determine the location of the error by receiving an indication from the timer 310 that the duration was satisfied and then determine which FSM was executing the operation when the indication is received. For example, the system 300 could determine that when the timer 310 satisfied the duration, the operation was executing at protocol FSM 340-b. Accordingly, the system 300 can determine the location of the error by determining what state the system 300 was in at the time of the hang. In at least one embodiment, the system 300 can transmit an indication of the error (e.g., the one or more errors). For example, the system 300 can transmit logs indicating which FSMs failed and how.

In at least one embodiment, the system 300 can initiate a debug operation to fix the error and notify the host system the operation failed. During the debug operation, the system 300 can reset back to the idle state and also notify the host system of the error and whether the system 300 is ready to receive an additional request. In at least one embodiment, the hang recovery and error reporting architecture can ensure the following: if a primary FSM 305 is stuck within a non-idle state (e.g., the timer 310 satisfies the non-idle duration criterion), the reset to the idle state is propagated to a coupled auxiliary FSM (e.g., if FSM 305-e experiences a hang, the reset to the ide state is also propagated to a protocol FSM 340); all resettable registers (e.g., counters) get reset along with corresponding FSMs going back to idle states; and the system 300 communicates to the requester (e.g., host system) that the request could not be processed (e.g., transmit a NACK response) and indicates the request should be transmitted again. In some embodiments, the log 315 can be in a non-resettable register that does not reset when the system 300 goes from the non-idle state back to the idle state after a hang or error—e.g. the system 300 can keep track of the errors in a non-resettable register. In some embodiments, transmitting the response to the host system also ensures that not only is the FPGA controller 160 reset, but also that the baseboard 150 is resect such that future requests can be processed.

In at least one embodiment, the hang recovery and error reporting architecture can include: that for every FSM (e.g., FSMs 305, protocol FSMs 320, sub-state FSMs 325, protocol FSMs 330, protocol FSMs 340, and protocol FSMs 345) in a non-idle state, it will eventually go back to an idle state; for primary FSMs 305, coupled FSMs (e.g., protocol FSMs 320, sub-state FSMs 325, protocol FSMs 330, protocol FSMs 340, and protocol FSMs 345) in non-idle states eventually go back to an idle state; any resettable register (including counters) holding non-reset values will return to reset values; for every primary FSM 305 that de-hangs appropriate interrupts, a response (NACK) and error reporting event is generated; for every request and response output interface signals that signifies the FPGA controller 160 is ready to receive requests and responses, even if they are currently not available, they will eventually be ready (e.g. interface compliant response to host system).

By utilizing the hang recovery and error reporting architecture, the system 300 can ensure it returns to the idle state after an error or hang and that the host system is informed of the error.

Figure 4:
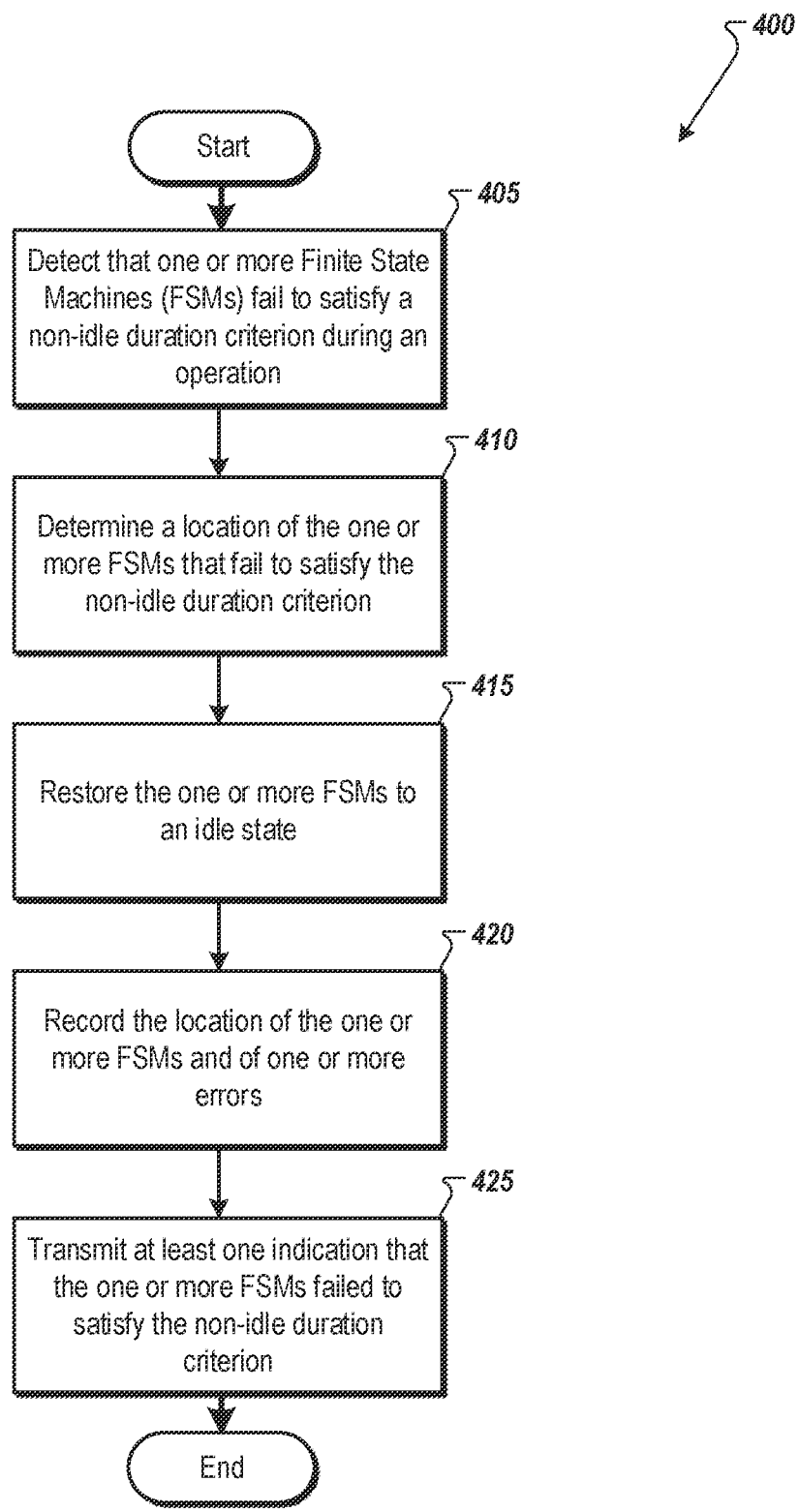
FIG. 4 illustrates a flow diagram of an example method for a hang recovery and error reporting architecture.

FIG. 4 illustrates a flow diagram of a method 400 for hang recovery and error reporting architecture on field-programmable gate array (FPGA) based controller solutions, according to at least one embodiment. The method 400 can be performed by processing logic comprising hardware, software, firmware, or any combination thereof In at least one embodiment, the method 400 is performed by system 100 as described with reference to FIGS. 1A-B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other diagrams illustrating a methods for hang recovery and error reporting architecture on FPGA based controller solutions are possible.

At operation 405, processing logic detects that one or more finite state machines (FSMs) of a plurality of FSMs (e.g., a set of FSMs as described with reference to FIG. 3) fails to satisfy a non-idle duration during an operation. In at least one embodiment, the one or more FSMs that fail to satisfy the non-idle duration criterion are associated with one or more errors. In some embodiments, the one or more errors include at least one of protocol violations, illegal payload requests, lost response packets as described with reference to FIG. 2. In at least one embodiment, the processing logic is to detect that one or more FSMs fail to satisfy the non-idle duration by determining that a counter associated with the operation and the one or more FSMs exceeds a non-idle duration criterion. The counter may start when execution of the operation is begun at the one or more FSMs, and the counter may continue to increment until execution of the operation is complete. If the counter reaches a predefined threshold before the operation is complete, then an error may be detected.

In at least one embodiment, the plurality of FSMs are associated with one or more stats of the operation as described with reference to FIG. 3. In such embodiments, a device comprising the processing logic and plurality of FSMs can comprise one or more additional FSMs coupled to the plurality of FSMs, where each additional FSM of the plurality of additional FSMs is associated with a sub-state of the operation. In at least one embodiment, the processing logic is to receive a request to execute an operation at the one or more FSMs. In some embodiments, the processing logic is to execute the operation at the one or more FSMs, where the processing logic is to detect that the one or more FSMs fail to satisfy the non-idle duration criterion in response to executing the operation at the one or more FSMs. In at least one embodiment, the device comprises a controller where the controller is a field-programmable gate array (FPGA) controller.

At operation 410, the processing logic can determine a location of the one or more FSMs that fail to satisfy the non-idle duration criterion. In at least one embodiment, the processing logic is to determine the location of the one or more FSMs by determining an FSM of the one or more FSMs executing the operation at a time the non-idle duration criterion is not satisfied. For example, the processing device can determine the location of the error by determining which FSM is executing the operation when the timer satisfies the non-idle duration criterion as described with reference to FIG. 3. In at least one embodiment, a notice is generated each time an error occurs. In at least one embodiment, the notice includes a location of the error. In some embodiments, the error is stored in an FPGA controller (e.g., FPGA controller 160) register for error logging and for triaging. In at least one embodiment, the FPGA controller 160 can store a most recent error or event in the register when multiple locations of errors are detected for a same FSM.

At operation 415, the processing logic is to restore the one or more FSMs to an idle state, rendering them available for further processing. In at least one embodiment, the processing logic is to reset the counter to a first value in response to restoring the one or more FSMs to the idle state. In at least one embodiment, to restore the one or more FSMs, the processing logic is to restore the one or more additional FSMs associated with the one or more FSMs to the idle state—e.g., the processing logic is to reset one or more of the auxiliary FSMs as described with reference to FIG. 3.

In at least one embodiment, the device comprises one or more registers associated with each FSM of the plurality of FSMs. In such embodiments, the processing device is to determine a first value stored in a register of the one or more registers in response to detecting that the one or more FSMs fail to satisfy the non-idle duration criterion. In some embodiments, the processing logic is to determine that the first value stored in the register of the one or more registers is different than a threshold value (e.g., a reset value as described with reference to FIG. 3). In some embodiments, the processing logic is to restore the first value stored in the register to the threshold value in response to determining that the first value is different than the threshold value. In some embodiments, the processing logic is to determine the first value is the same as the threshold value. In such embodiments, the processing logic is to refrain from modifying or otherwise changing the first value. That is, the processing logic can determine if registers are storing data or a reset value. If the processing logic determines the registers are still storing data, the processing logic can reset the registers to the reset value.

In some embodiments, the processing logic is to determine the one or more errors associated with the one or more FSMs from a plurality of errors associated with the device. In such embodiments, the plurality of errors associated with the device are determined during a test session of the device as described with reference to FIG. 2. For example, the processing logic can initiate a test session, determine illegal stimuli, legal stimuli, and/or additional errors, and generate a hang recovery and error reporting architecture. The controller can comprise hang logic configured to utilize the hang recovery and error reporting architecture.

At operation 420, the processing logic is to record the location of the one or more FSMs and the one or more errors. For example, the processing logic can record the location of the one or more FSMs at the log 315 as described with reference to FIG. 3. In at least one embodiment, the log is a non-resettable register—e.g., the log is not reset when the device is returned to the idle state. In at least one embodiment, the processing logic can transmit the one or more errors determined in response to recording the one or more errors—e.g., the processing logic can transmit detailed logs of which FSMs failed and how.

At operation 425, the processing logic is to transmit at least one indication that the one or more FSMs failed to satisfy the non-idle criterion. For example, the processing logic can transmit an indication the request was not executed and to transmit the request again. In at least one embodiment, the at least one indication can indicate which FSMs failed, how each FSM failed, and the one or more errors—e.g. the processing logic can transmit multiple indications, each indication detailing an error at a respective FSM. In at least one embodiment, the processing logic can receive a request to execute an operation at the one or more FSMs after transmitting the indication. In such embodiments, the processing logic can execute the operation at the one or more FSMs in response to receiving the request. In some embodiments, the processing logic can detect the one or more FSMs satisfy the non-idle duration criterion in response to executing the operation at the one or more FSMs. In such embodiments, the processing logic can transmit an indication the operation was executed.

Figure 5:
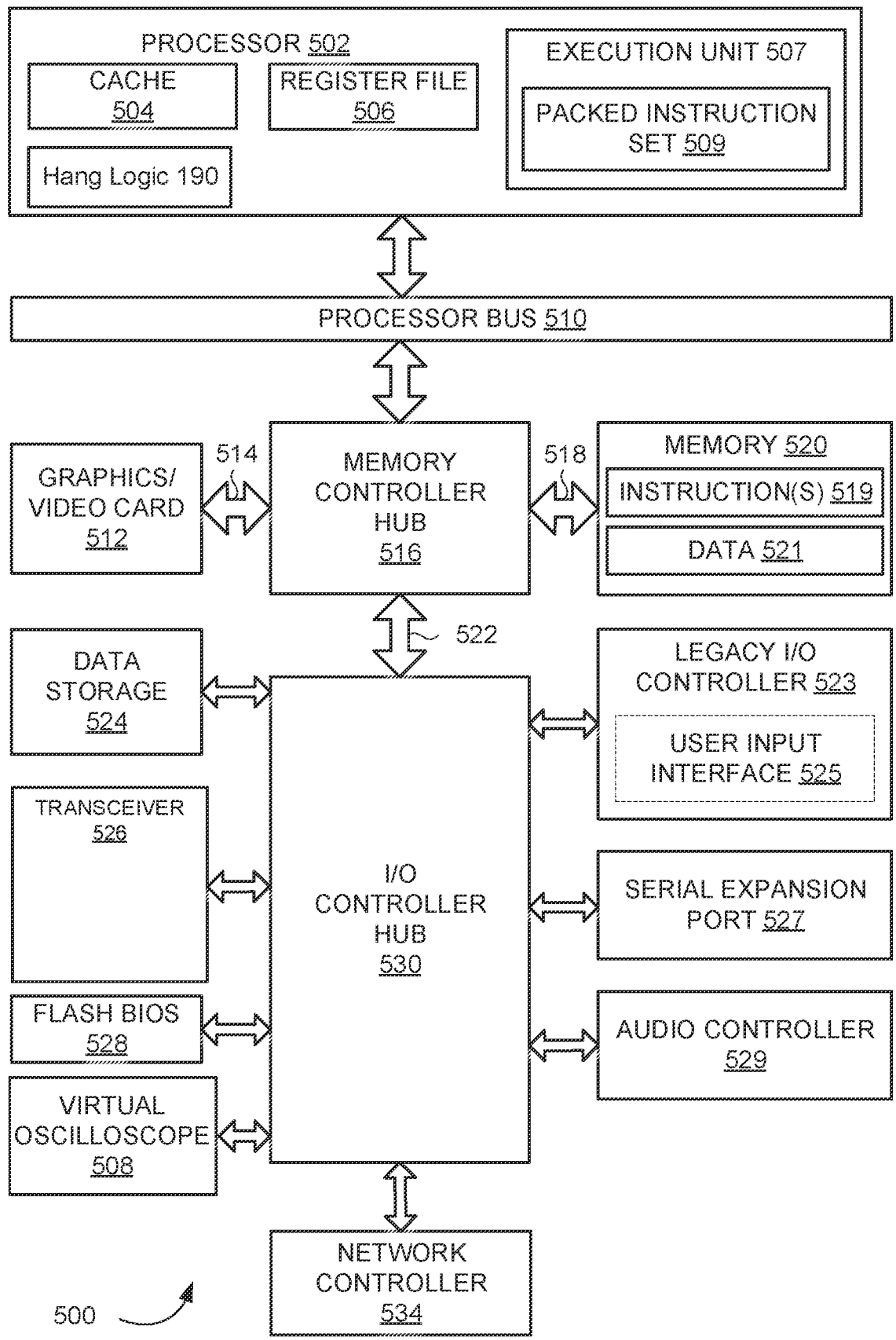
FIG. 5 illustrates a computer system implementing a hang recovery and error reporting architecture for a field-programmable gate array (FPGA) based controller, in accordance with at least some embodiments.

FIG. 5 illustrates a computer system 500 including a transceiver including a chip-to-chip interconnect, in accordance with at least one embodiment. In at least one embodiment, computer system 500 may be a system with interconnected devices and components, an SOC, or some combination. In at least one embodiment, computer system 500 is formed with a processor 502 that may include execution units to execute an instruction. In at least one embodiment, computer system 500 may include, without limitation, a component, such as processor 502, to employ execution units including logic to perform algorithms for processing data. In at least one embodiment, computer system 500 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 500 may execute a version of WINDOWS' operating system available from Microsoft Corporation of Redmond, Wash., although other operating systems (UNIX and Linux for example), embedded software, and/or graphical user interfaces may also be used.

In at least one embodiment, computer system 500 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 500 may be used in devices such as graphics processing units (GPUs), network adapters, central processing units and network devices such as switch (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 500 may include, without limitation, processor 502 that may include, without limitation, one or more execution units 507 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 500 is a single processor desktop or server system. In at least one embodiment, computer system 500 may be a multiprocessor system. In at least one embodiment, processor 502 may include, without limitation, a CISC microprocessor, a RISC microprocessor, a VLIW microprocessor, a processor implementing a combination of instruction sets, or any other processor device, such as a digital signal processor, for example. In at least one embodiment, processor 502 may be coupled to a processor bus 510 that may transmit data signals between processor 502 and other components in computer system 500.

In at least one embodiment, processor 502 may include, without limitation, a Level 1 ("L1") internal cache memory ("cache") 504. In at least one embodiment, processor 502 may have a single internal cache or multiple levels of internal cache. In at least one embodiment, cache memory may reside external to processor 502. In at least one embodiment, processor 502 may also include a combination of both internal and external caches. In at least one embodiment, a register file 506 may store different types of data in various registers including, without limitation, integer registers, floating point registers, status registers, and instruction pointer register.

In at least one embodiment, execution unit 507, including, without limitation, logic to perform integer and floating point operations, also resides in processor 502. Processor 502 may also include a microcode ("ucode") read only memory ("ROM") that stores microcode for certain macro instructions. In at least one embodiment, execution unit 502 may include logic to handle a packed instruction set 509. In at least one embodiment, by including packed instruction set 509 in an instruction set of a general-purpose processor 502, along with associated circuitry to execute instructions, operations used by many multimedia applications may be performed using packed data in a general-purpose processor 502. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, an execution unit may also be used in microcontrollers, embedded processors, graphics devices, DSPs, and other types of logic circuits. In at least one embodiment, computer system 500 may include, without limitation, a memory 520. In at least one embodiment, memory 520 may be implemented as a DRAM device, an SRAM device, flash memory device, or other memory device. Memory 520 may store instruction(s) 519 and/or data 521 represented by data signals that may be executed by processor 502.

In some embodiments, the processor 102 can include hang logic 190 as described with reference to FIG. 1. In such embodiments, the system 500 can utilize a hang recovery and error reporting architecture as described with reference to FIGS. 1-4.

In at least one embodiment, a system logic chip may be coupled to processor bus 510 and memory 520. In at least one embodiment, the system logic chip may include, without limitation, a memory controller hub ("MCH") 516, and processor 502 may communicate with MCH 516 via processor bus 510. In at least one embodiment, MCH 516 may provide a high bandwidth memory path 518 to memory 520 for instruction and data storage and for storage of graphics commands, data and textures. In at least one embodiment, MCH 516 may direct data signals between processor 502, memory 520, and other components in computer system 500 and to bridge data signals between processor bus 510, memory 520, and a system I/O 522. In at least one embodiment, a system logic chip may provide a graphics port for coupling to a graphics controller. In at least one embodiment, MCH 516 may be coupled to memory 520 through high bandwidth memory path 518, and graphics/video card 512 may be coupled to MCH 516 through an Accelerated Graphics Port ("AGP") interconnect 514.

In at least one embodiment, computer system 500 may use system I/O 522 that is a proprietary hub interface bus to couple MCH 516 to I/O controller hub ("ICH") 530. In at least one embodiment, ICH 530 may provide direct connections to some I/O devices via a local I/O bus. In at least one embodiment, a local I/O bus may include, without limitation, a high-speed I/O bus for connecting peripherals to memory 520, a chipset, and processor 502. Examples may include, without limitation, an audio controller 529, a firmware hub ("flash BIOS") 528, a transceiver 526, a data storage 524, a legacy I/O controller 523 containing a user input interface 525 and a keyboard interface, a serial expansion port 527, such as a USB, and a network controller 534. Data storage 524 may comprise a hard disk drive, a floppy disk drive, a CD-ROM device, a flash memory device, or other mass storage device. In an embodiment, the transceiver 526 includes a constrained FFE 508.

In at least one embodiment, FIG. 5 illustrates a system, which includes interconnected hardware devices or "chips" in the transceiver 526—e.g., the transceiver 526 includes a chip-to-chip interconnect including the first device 110 and second device 112 as described with reference to FIG. 1). In at least one embodiment, FIG. 5 may illustrate an exemplary SoC. In at least one embodiment, devices illustrated in FIG. 5 may be interconnected with proprietary interconnects, standardized interconnects (e.g., PCIe), or some combination thereof In at least one embodiment, one or more components of system 500 are interconnected using compute express link ("CXL") interconnects.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system comprising:
 a device comprising a controller, a plurality of finite state machines (FSMs), and one or more registers associated with each FSM of the plurality of FSMs, wherein the device is to:
  detect that one or more FSMs of the plurality of FSMs fails to satisfy a non-idle duration criterion during an operation, wherein the one or more FSMs that fail to satisfy the non-idle duration criterion are associated with one or more errors;
  determine a location of the one or more FSMs that fail to satisfy the non-idle duration criterion;
  determine a first value stored in a register of the one or more registers in response to detecting that the one or more FSMs fails to satisfy the non-idle duration criterion;
  determine that the first value is different than a threshold value;
  restore the one or more FSMs to an idle state by storing the threshold value to the register in place of the first value in response to determining the first value is different than the threshold value;
  record the location of the one or more FSMs and the one or more errors; and transmit at least one indication that the one or more FSMs failed to satisfy the non-idle duration criterion.

2. The system of claim 1, wherein to detect that the one or more FSMs fail to satisfy the non-idle duration, the device is to:
determine a counter associated with the operation and the one or more FSMs exceeds the non-idle duration criterion.

3. The system of claim 2, wherein the device is to:
reset the counter to a first value in response to restoring the one or more FSMs to the idle state.

4. The system of claim 1, wherein the plurality of FSMs are associated with one or more states of the operation, and wherein the device comprises one or more additional FSMs coupled to the plurality of FSMs, each additional FSM of the plurality of additional FSMs is associated with a sub-state of the operation.

5. The system of claim 4, wherein to determine the location of the one or more FSMs, the device is to:
determine an FSM of the one or more FSMs or of the one or more additional FSMs executing the operation at a time the non-idle duration criterion is not satisfied.

6. The system of claim 4, wherein to restore the one or more FSMs, the device is to:
restore the one or more additional FSMs associated with the one or more FSMs to the idle state.

7. The system of claim 1, wherein the device is to:
determine that the first value stored in the register is the same as a threshold value; and
refrain from modifying the first value stored in the register in response to determining the first value is the same as the threshold value.

8. The system of claim 1, wherein to restore the one or more FSMs to the idle state, the device is to:
determine the one or more errors associated with the one or more FSMs from a plurality of errors associated with the device, wherein the plurality of errors associated with the device are determined during a test session of the device.

9. The system of claim 1, wherein the device is to:
receive a request to execute an operation at the one or more FSMs; and
execute the operation at the one or more FSMs, wherein the device is to detect the one or more FSMs fail to satisfy the non-idle duration criterion in response to executing the operation at the one or more FSMs.

10. The system of claim 1, wherein the device is to:
receive a request to execute an operation at the one or more FSMs after transmitting the indication;
execute the operation at the one or more FSMs in response to receiving the request; and
detect the one or more FSMs satisfy the non-idle duration criterion in response to executing the operation at the one or more FSMs.

11. The system of claim 1, wherein the controller is a field programmable gate array (FPGA) controller.

12. A method comprising:
detecting, at a controller coupled with a plurality of finite state machines (FSMs), that one or more finite state machines (FSMs) of a plurality of FSMs fail to satisfy a non-idle duration criterion during an operation, wherein the one or more FSMs that fail to satisfy the non-idle duration criterion are associated with one or more errors, wherein each FSM of the plurality of FSMs is associated with one or more registers;
determining a location of the one or more FSMs that fail to satisfy the non-idle duration criterion;
determining a first value stored in a register of the one or more registers in response to detecting that the one or more FSMs fails to satisfy the non-idle duration criterion;
determining that the first value is different than a threshold value;
recording the location of the of the one or more FSMs and the one or more errors;
restoring the one or more FSMs to an idle state by storing the threshold value to the register in place of the first value in response to determining the first value is different than the threshold value; and
transmitting an indication that the one or more FSMs failed to satisfy the non-idle duration criterion.

13. The method of claim 12, further comprising:
determining a counter associated with the operation and the one or more FSMs exceeds the non-idle duration criterion, wherein detecting that the one or more FSMs fail to satisfy the non-idle duration is responsive to determining the counter exceeds the non- idle duration criterion.

14. The method of claim 13, further comprising:
resetting the counter to a first value in response to restoring the one or more FSMs to the idle state.

15. The method of claim 12, wherein the plurality of FSMs are associated with one or more states of the operation, and wherein the controller is coupled to one or more additional FSMs coupled to the plurality of FSMs, each additional FSM of the plurality of additional FSMs associated with a sub-state of the operation.

16. The method of claim 15, further comprising:
determining an FSM of the one or more FSMs or of the one or more additional FSMs executing the operation at a time the non-idle duration is not satisfied, wherein determining the location of the one or more FSMs is responsive to determining the FSM or the one or more additional FSMs.

17. The method of claim 15, further comprising:
restoring the one or more additional FSMs associated with the one or more FSMs to the idle state, wherein restoring the one or more FSMs in responsive to restoring the one or more additional FSMs.

18. The method of claim 12, further comprising:
determining that the first value stored in the register of the one or more registers is the same as a threshold value; and
refraining from modifying the first value stored in the register in response to determining the first value is the same as the threshold value.

19. The method of claim 12, further comprising:
determining the one or more errors associated with the one or more FSMs from a plurality of errors associated with a device comprising the controller, wherein the plurality of errors associated with the device are determined during a test session of the device, and wherein restoring the one or more FSMs is responsive to determining the one or more errors associated with the one or more FSMs.

20. A non-transitory computer-readable medium storing instructions thereon, wherein the instructions, when executed by a processing device, cause the processing device to:
detect, at a controller coupled with a plurality of finite state machines (FSMs), that one or more finite state machines (FSMs) of a plurality of FSMs fail to satisfy a non-idle duration criterion during an operation, wherein the one or more FSMs that fail to satisfy the non-idle duration criterion are associated with one or more errors, wherein each FSM of the plurality of FSMs is associated with one or more registers;
determine a location of the one or more FSMs that fail to satisfy the non-idle duration criterion;
determine a first value stored in a register of the one or more registers in response to detecting the one or more FSMs fails to satisfy the non-idle duration criterion;
determine that the first value is different than a threshold value;
record the location of the of the one or more FSMs and the one or more errors;
restore the one or more FSMs to an idle state by storing the threshold value to the register in place of the first value in response to determining the first value is different than the threshold value; and
transmit an indication that the one or more FSMs failed to satisfy the non-idle duration criterion.

\* \* \* \* \*